Jan. 21, 1969     W. B. LLOYD     3,422,965
MANIPULATOR APPARATUS

Filed Feb. 13, 1967                                        Sheet _1_ of 2

WITNESSES:
bernard R. Gregory
James F. Young

INVENTOR
Wayne B. Lloyd
BY W. F. Stratcliff
AGENT

United States Patent Office 3,422,965
Patented Jan. 21, 1969

3,422,965
MANIPULATOR APPARATUS
Wayne B. Lloyd, Catonsville, Baltimore, Md., assignor to Westinghouse Electric Corporation, Pittsburgh, Pa., a corporation of Pennsylvania
Filed Feb. 13, 1967, Ser. No. 615,536
U.S. Cl. 214—1      2 Claims
Int. Cl. B25j 3/04; B63b 3/13

ABSTRACT OF THE DISCLOSURE

A master-slave manipulator apparatus useful on undersea vehicles in which a master arm inside the hull is actuable by an operator to effect corresponding movement of an exterior slave arm, without requiring control feedback from the slave arm, comprising multiple-pivot slave and master arms with hydraulic rotary actuators on the slave arm joints, an open-loop control system including electro-hydraulic flow-control servo valve devices on the slave arm for controlling rate of supply of hydraulic fluid to the actuators respectively, and means for producing respective control signals for the servo valves on the slave arm according to: the angular velocity and acceleration between relatively movable parts of the master arm at each of its joints, the angular positions of such master arm parts with respect to a common reference, and the relationship between such conditions which affect gravity and inertia torque loads on the respective actuators of the slave arm.

---

The present invention relates to manipulator apparatus.

*Background of the invention*

(1) The invention relates to hydraulically-operated master-slave manipulator arm aparatus suited for use on undersea vehicles.

(2) Previous attempts have been made to use the master-slave method of control to improve manipulator agility. At least one of these, having both position and force feedback, is almost unbelievably agile, but its master arms are bulky, the system is very complex and the mean time before failure tends to be short.

The conventional approach to master-slave control is by use of a closed position servo loop through use of a position pick-off mounted on each joint of the slave arm and used in conjunction with a companion pickoff on the control arm. This type of position slaving has the disadvantages of position pickoffs operating in the hostile environment and of many additional wires (from the pickoffs) passing through the pressure hull. Another disadvantage given for prior art master-slave manipulators with position feed-back is the snap-in effect, which is the alignment transient which can occur when the system is first turned on with an initial misalignment between the position of the master and slave arms.

In the case of undersea applications, the disadvantages mentioned above, along with that of higher cost, have largely prevented the use of master-slave manipulators.

*Summary*

In view of the foregoing remarks, the present invention provides a master-slave manipulator apparatus which preserves the agility and maneuverability of this type of apparatus, but which overcomes the above objections to previous forms of such type by use of an open-loop control system which takes into consideration relationships at the master arm which affect gravity and inertia torque conditions of the slave arm.

Other objects and advantages will become apparent from the following detailed description of an illustrative embodiment of the invention when taken in connection with the accompanying drawings, in which:

FIG. 3b is a diagram setting forth input and output curves representing operating characteristics of the exemplified valve-actuator combination of FIG. 3a;

Figure 1:
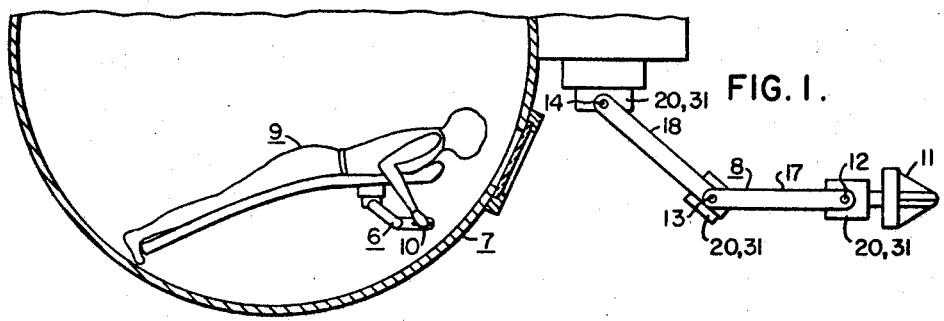
FIGURE 1 is an elevation view showing schematically in outline a typical configuration of master and slave arms affiliated with a spherical-shaped underwater vehicle hull, shown partially and in cross-section.

Referring now to the drawings in detail, the nature of master-slave control may be understood from consideration of FIGURES 1 and 2. As seen in FIGURE 1, the operator uses a master arm 6 inside the hull 7 which is, in essence, a scaled down model of the slave arm 8 outside the hull. To control the slave arm, the operator 9 grasps the master arm FIGURE 2 by a grip 10 and steers the master grip in the direction required for the slave hand 11. The slave arm 8, being positionally slaved to the master arm 6, joint-for-joint, moves its hand 11 through a displacement which corresponds to that of the master grip displacement in sense and direction, but scaled up in magnitude. Similarly, to control the attitude of the slave hand 11, the master grip 10 is placed in the attitude required by the slave hand.

The advantages of master-slave control are basically as follows. The operator need be conscious only of displacing the master grip 10 through a preconceived displacement which is exactly analogous (in sense and magnitude) to the required displacement for the slave hand 11. During the control action, the operator has a continuous kinesthetic knowledge of control arm position and, hence, of manipulator arm position. (He obtains this knowledge from the nerves in his hand and arm—visual contact with the master arm is of secondary importance.) Initiation of the rates involved, determination of the direction of the rates, and termination of the rates are done with only a small conscious effort because the motion closely resembles the commonplace translations of everyday human experience. High slewing speeds are practicable because it is easily possible to keep the control arm within safe positional limits even when high velocities are used during positional changes. The operator is saved from the nerve straining tedium of a step-by-step estimation of the individual joint moves required to achieve a position change of the hand, because any convenient combination of joint movements may be used with no thought as to the individual movements. One result of this is that the need for a very costly linear wrist-extended degree of freedom by means of a telescoping action is eliminated.

Figure 2B:
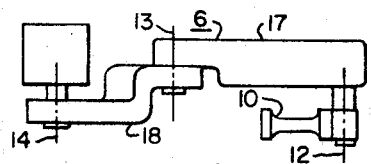
FIGS. 2a and 2b, are side and top views, respectively, showing in outline an exemplified form of master arm.
Figure 2A:
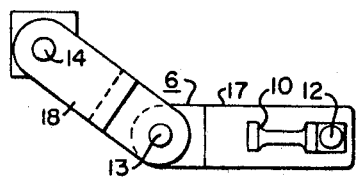

One version of the master arm 6 is shown in FIGS. 2a and 2b. This arm has horizontal pivot axes 12, 13 and 14 considered as wrist, elbow and shoulder joints, respectively, which are analogous to those on the slave arm 8 which in turn is analogous to a human arm. The grip 10 is placed alongside the lower arm segment 17, instead of in front of it, to achieve a smaller swept volume for the master arm. Obviously, there is a limit to how small such a control arm can be, because a very small arm would be excessively sensitive. The lower size limit is not easy to determine, but experience with master arm mockups has indicated that a length of 6″ between joint axes on both the upper and lower arm segments, or a total arm length somewhat in excess of 12″ should provide excellent control for slave arms up to 8 feet in length. Such a master arm could be placed within a six-foot internal diameter pressure hull with relative ease. If the installation volume available demands it, the base of the arm can be made movable sideways and/or fore-and-aft to allow operation within a volume much less than the normally swept sphere. If necessary, further compaction of the master arm could be achieved by disjoining the lower arm from the upper and placing it on a horizontal axis collinear with the axis 14, at some loss in control effectiveness.

Figure 3A:
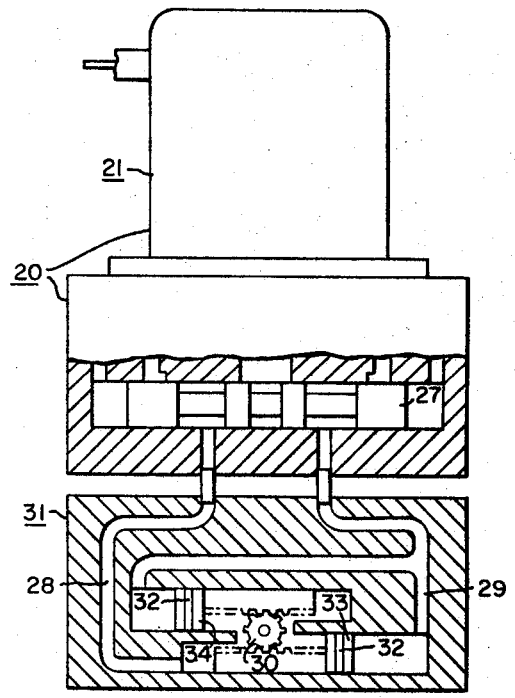
FIG. 3a is a schematic showing, partly in cross-section and partly in outline, of an exemplified electro hydraulic flow-control valve device and a rotary hydraulic actuator combined therewith, suitable for employment in the apparatus of the present invention.
Figure 3B:
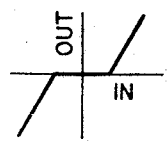

The present invention is based on the use of a precise and predictable flow control servo valve 20 such as the commercially available Raymond Atchley servo valve device with jet pipe first stage and mechanical feedback by leaf spring from the second stage spool valve to the jet pipe. The power stage of such a valve, along with the associated actuator, is shown exposed in FIGURE 3a. The action of the torque motor in portion 21, jet pipe and feedback spring (all of which are not shown) is to produce a displacement of the spool 27 whice is proportional to the valve input current to the torque motor. The spool 27 is precisely over-lapped to 50% of its total stroke in both directions. The purpose of the overlap is to effectively obstruct the actuator pinion case line 28 and the piston head line 29 to minimize creep of the actuator output shaft 20 under load torque and zero command. The actuator 31 has essentially zero cross-port leakage due to O-ring seals 32 on the rack pistons 33 and 34. The input-output curve for such a valve and actuator is shown in FIGURE 3b. In this curve the input quantity is torque motor current and output is acuator angular velocity $d\theta_o/dt$ or $\dot\theta_o$.

Figure 4:
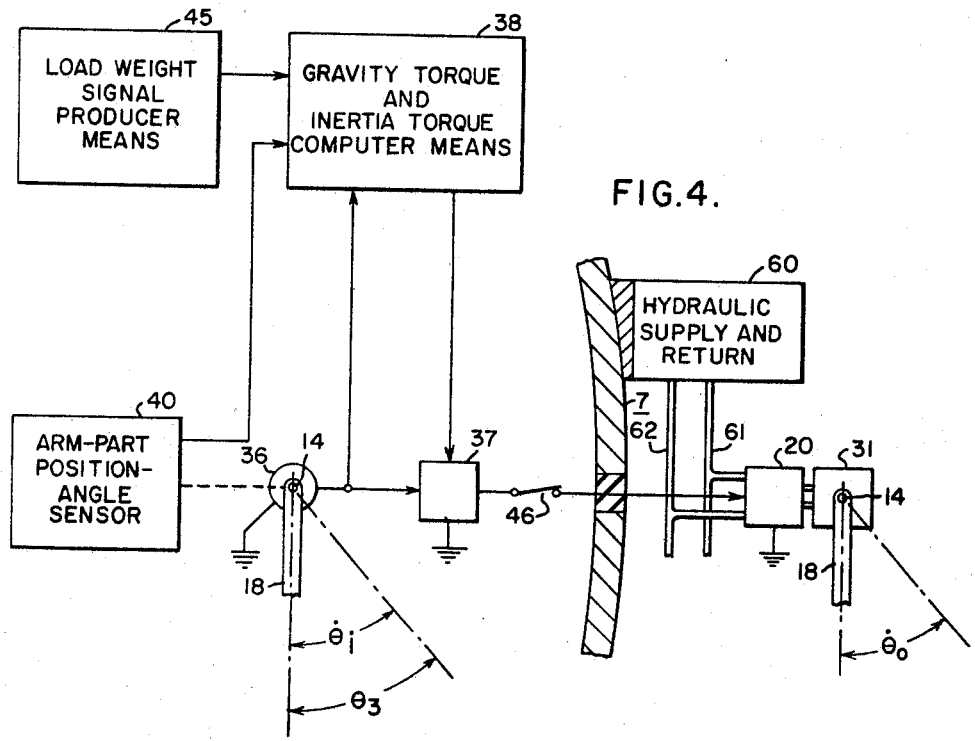
FIG. 4 is a block diagram of control features of the novel manipulator apparatus of the present invention as applied to an exemplified joint of the master arm and its counterpart joint on the slave arm of such apparatus.

Consider the single degree of freedom system shown in FIGURE 4 representing a single joint at one master and slave arm. In this system the control handle 18 rotates a tachometer 36, which in turn supplies the input to an amplifier 37. The amplifier gain is modified by a computer means 38 according to the angular acceleration of the arm sensed by a signal derived from pickoff at output from the tachometer 36, as well as the angular position of the arm as sensed by an arm-position-angle sensor means 40. The amplifier output supplies a control current to the respective servo valve 20, which ports oil to the respective rotary hydraulic actuaor 31. The amplifier has a nonlinear gain characeristic around the null output from the tachometer 36 which exactly cancels the inherent lag characteristic of the spool valve 27 due to its 50% overlap, so that it is valid to set forth that:

$$\dot\theta_o = \dot\theta_i\, k_t\, k_a\, k_{va}$$

where $k_t$, $k_a$ and $k_{va}$ are the gains of the tachometer, amplifier, and valve-actuator combination, respectively; $\dot\theta_o$ is the actuator angular output velocity; and $\dot\theta_i$ is the tachometer input velocity. If the product (1) $$k_t\, k_a\, k_{va} = 1.0$$

then $\dot\theta_o = \dot\theta_i$, which means that the output member, the manipulator link 18, for example, will move at the same angular rate as the corresponding control member, link 18, for example, of the master arm 6. In the present apparatus while the slave arm 8 is unloaded or lightly loaded this is true at all times, and the output angle $\theta_o$ always equals the input angle $\theta_i$. As an analogy, consider two automobiles, auto A and auto B initially sitting side by side on a two lane road. If auto A can successfully command auto B to always have the same speed as its own, then auto B will arrive at any destination at the same time as auto A. The effect would be exactly equivalent to positional slaving between the two. Thus, positional slaving is accomplished in the system of FIGURE 4 by only one conductor per axis plus a common conductor for the system, and with no pickoffs in the hostile environment outside the hull 7. Further, it is accomplished by use of proven undersea hardware in a manner that does not alter or compromise the basic reliability of the existing arm. (A set of pushbutton controls could easily be provided for redundancy if desired). In the overall system of the present invention, each joint of the master and slave arms have a system similar to that shown in FIG. 4, with the possible exception of sharing the computer means in common.

Since this is an open-loop system there are no closed loop stability problems, but in an open-loop system there is the necessity for more careful attention to error sources and to the compensation of errors. A manipulator, however, does not require extreme precision of positional correspondence, because the final accuracy is provided by visual feedback. It is necessary, nevertheless, to account for and compensate for the major sources of error. The main source of error is from torques of various types, because torque reactions imposed on the actuator affect the pressure differential experienced by the actuator pistons 33 and 34 for a given degree of opening of the spool valve 27 in the valve 20 and hence the valve flow gain. The main torques, listed in estimated order of importance, are gravitational, frictional, and inertial torques. For free fall space conditions the gravitational torques (the most difficult to compensate) are absent, which makes possible a more simple control system for space applications.

The method of compensation employed in the present apparatus may be explained as follows. The gain of the valve-actuator combination is (2) $$k_{va} = k\sqrt{dP_s \pm T}$$

where $k$ is a constant, $P_s$ is supply pressure, $d$ is actuator displacement factor and T is actuator torque. The sign of T is plus for over-riding torques which add to the effectiveness of a given spool valve position, and minus for retarding torques, which reduce such effectiveness. To properly account for the variation of $k_{va}$, the amplifier gain $k_a$ is varied by the computer means 38 in accord with Equation 1.

From Equations 1 and 2:

(3) $$k_a = K/\sqrt{P_s d \pm T}$$

where K is another constant. The constants $k$ and $K$ are straightforward physical parameters of the valve-actuator 20–31 and/or tachometer 36.

Figure 5:
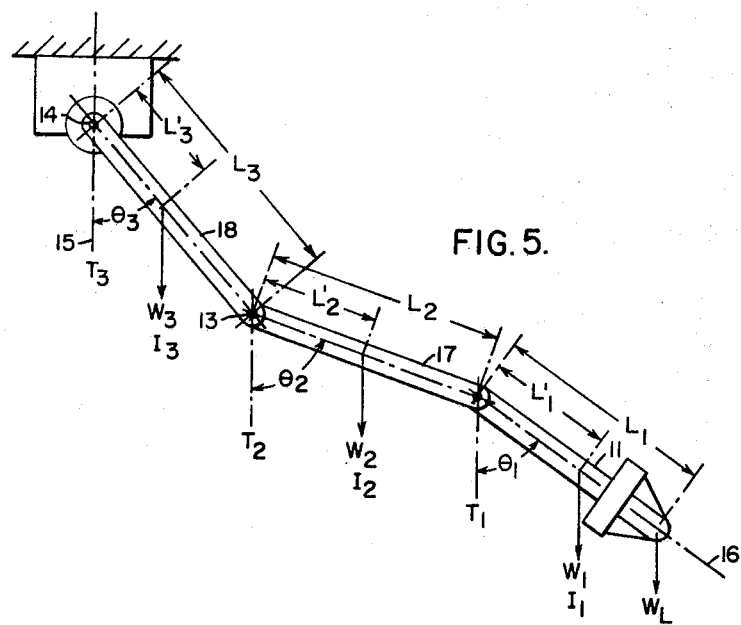
FIG. 5 is a diagram showing kinematic relationships between parts of an exemplified manipulator arm.

To illustrate the nature of the torques compensated for by the computer means 38, the torque equations for the three axes 12, 13 and 14 of the slave arm 8 which are perpendicular to the vertical plane are given below referring to FIG. 5:

(4) $T_1 = W_1 L_1 \sin \theta_1 + W_1 L_1' \sin \theta_1 + T_{f1} + I_1 \ddot\theta_1 + D_1 \dot\theta_1$ (5) $T_2 = W_L(L_1 \sin \theta_1 L_2 \sin \theta_2) + W_1 (L_1' \sin \theta_1 + L_2 \sin \theta_2) + W_2 L_2' \sin \theta_2$
$\qquad + T_{f2} + I_2 \ddot\theta_2 + I_1 \ddot\theta_1 + D_2 \dot\theta_2 + D_1 \dot\theta_1$ (6) $T_3 = W_L(L_1 \sin \theta_1 + L_2 \sin \theta_2 + L_3 \sin \theta_3)$
$\qquad + W_1[L_1' \sin \theta_1 + L_2 \sin \theta_2 + L_3 \sin \theta_3] + W_2[L_2' \sin \theta_2 + L_3 \sin \theta_3] + W_3 L_3' \sin \theta_3 + T_{f3} + I_3 \ddot\theta_3$
$\qquad + I_1 \ddot\theta_1 + I_2 \ddot\theta_2 + D_3 \dot\theta_3 + D_2 \dot\theta_2 + D_1 \dot\theta_1$ which can be simplified to:

(7) $T_1 = K_1 \sin \theta_1 + T_{f1} + I_1 \ddot\theta_1 + D_1 \dot\theta_1$ (8) $T_2 = T_1 - T_{f1} + K_2 \sin \theta_2 + T_{f2} + I_2 \ddot\theta_2 + D_2 \dot\theta_2$ (9) $T_3 = T_2 - T_{f2} + K_3 \sin \theta_3 + T_{f3} + I_3 \ddot\theta_3 + D_3 \dot\theta_3$ In these equations the symbols are indicated in FIG. 5.

L, W, θ, I, D, sub L, sub f, designate length, weight, angle, mass moment of inertia, damping, and friction, respectively.

In general, the torque T associated with each joint can be predicted in advance or can be deduced from a knowledge of position of the arm, time derivatives of the arm position, and load on the arm. Thus, for each joint of the arm, a continuous computation is made of joint torque and this computed torque is used to continuously correct the amplifier gain $k_a$. Since the slave arm 8 is inaccessible, computations are based on information obtained from the master arm 6 and knowledge as to the construction of such slave arm, and this is valid, since the computations are made accurate to bring the slave arm into positional correspondence with the master arm, at least until the time such slave arm picks up a load $W_L$, which can be compensated for by the computer means by introduction of a signal thereto from a load-weight-signal producer means 45 on the basis of estimation and manual adjustment by the operator, for example.

Before activating the master arm 6 for use, it is placed in initial positional correspondence with the slave arm 8, e.g., stowed positioned of the master 6 is designed to exactly duplicate the stowed position of the slave 8. Then, when the system is turned on, the slave 8 duplicates the movements of the master 6. However, after a long succession of movements, positional errors may develop, requiring realignment of master and slave. To accomplish this, the master arm 6 has a convenient deactivate switch 46 which can be opened to allow alignment of the master arm with the slave arm without affect until reactivation of the master arm control. Also this same deactivate switch can be used in the event it is desired to use the push button type of control which can be provided as back-up for the present system. The necessity for periodic realignment of the open-loop system proposed herein for space and undersea use is believed to be insignificant in view of the fact that such manipulators are normally not used for highly repetitive, long enduring work.

The nature of the computing equipment necessary to vary the amplifier gain in accordance with joint torque, as described by Equation 3, will vary with the application. For space manipulators (of any load capacity) which are used in free fall or on the surface of relatively low-mass celestial bodies, such as the moon, the compensation would be very simple and inexpensive, involving only a fixed correction for friction and a simple passive derivative network for $I\ddot{\theta}$ torques.

An hydraulic supply and return means 60 supplies hydraulic fluid at a certain supply pressure to each servo valve device 20 via a common supply line 61 and accepts return of such fluid at a certain return pressure via a common return line 62.

Advantages of the invention:

(1) *Maximum reliability.*—With only electrical conductors penetrating the pressure hull and the avoidance of use of underwater pickoffs, the probability of manipulator control failure is greatly decreased.

(2) *Maximum maintainability.*—Since no pickoffs are underwater, it is not necessary to have physical access to the slave arm to service the controls.

(3) *Redundancy potential.*—The open-loop control does not compromise the basic reliability of the arm in any way. A set of redundant push button controls could be easily provided for back up and, in the event of master arm failure, would restore normal usefulness, as an operative manipulator; whereas, this probably couldn't be done with a closed loop manipulator.

(4) *Retrofit capability.*—Any arms already made, assuming they used the necessary type servo valves, can be easily equipped with this master control without even the necessity of removing the arm from the water.

(5) *Inherent snap-in transient prevention.*—Snap-in transients at start-up are an inherent tendency with all position feedback systems and connot be avoided with certain feedback schemes such as on-joint mechanical position feedback. With position feedback by position transducers such transients can be controlled to some extent (e.g., a deactivate switch on the master arm) but are subject to operator error. Complete elimination of the possibility of snap-in transients is a material contribution to vehicle and personnel safety, because practical experience has shown this to be a serious problem.

(6) *Avoids closed loop stability problems.*—Closed loop stability is a problem of serious importance in mechanical arms having many degrees of freedom, low natural frequencies, backlash and heavily overlapped valves. A closed loop arm would probably need to have zero lapped valves which would tend to rule out push button control as back-up, due to excessive creep.

(7) Negligible power consumption and heating due to control equipment.

(8) *Reasonable cost.*—Recurring cost of controls should be only a small percentage of the total arm cost. Nonrecurring costs should be reasonable due to the relatively simple, straightforward computation required and due to the shirt-sleeve environment for the controls. For space manipulators and lightly loaded earth based manipulators the cost of the controls would be very small due to the simplicity of computation for these cases.

I claim as my invention:

1. In manipulator apparatus including a multiple-joint manually-actuated master arm and a corresponding multiple-joint slave arm, the improvement thereof comprising:
   a respective hydraulic rotary actuator on each joint of said slave arm which has a double-acting piston means for applying a relative turning effort between arm parts at such joint according to pressure differential across said piston means,
   a common hydraulic supply line which extends along said arm for conveying hydraulic fluid at a certain supply pressure to each said rotary actuator for operating same,
   a common hydraulic return line which extends along said arm for conveying hydraulic fluid at a certain return pressure from each said rotary actuator,
   a respective electro-hydraulic servo valve device for each said rotary actuator, which is mounted on said slave arm adjacent to said actuator, controls degree of opening of the supply and return lines to respective opposite sides of said double-acting piston according to the level of an electrical control signal,
   a respective tachometer for each joint of said master arm which produces information as to the rate of turning of the relatively-movable arm parts at the respective joint,
   adjustable-gain amplifier means, which produces respective electrical control signals for the several electro-hydraulic servo valve devices,
   and computer means in receipt of information from the tachometers which varies the gains of said amplifier means to obtain positional correspondence between parts of said slave arm with moving parts of said master arm in recognition of the known weights of the slave arm parts and the relationships between the weights of such parts and their relative angular velocities and accelerations which affect the loads imposed on the actuators.

2. The manipulator apparatus of claim 1, wherein,
   said apparatus further includes a respective arm-part-position-angle sensor for each movable part of said master arm, which produces information as to the angular position of each such movable part relative to a common directional reference,
   said computer means also recognizes the relationship of gravity loads on said actuators according to the angular positions of the slave arm parts.

(References on following page)

References Cited
UNITED STATES PATENTS
2,858,947 11/1958 Chapman.
3,263,824 8/1966 Jones.

GERALD M. FORLENZA, *Primary Examiner.*
GEORGE F. ABRAHAM, *Assistant Examiner.*

U.S. Cl. X.R.
61—69